United States Patent
Manabe

(10) Patent No.: US 9,473,026 B2
(45) Date of Patent: Oct. 18, 2016

(54) STEP-UP CONVERTER FOR BOOSTING VOLTAGE FROM A POWER SOURCE SYSTEM

(75) Inventor: Kota Manabe, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 152 days.

(21) Appl. No.: 14/233,445

(22) PCT Filed: Jul. 19, 2011

(86) PCT No.: PCT/JP2011/066348
§ 371 (c)(1),
(2), (4) Date: Feb. 11, 2014

(87) PCT Pub. No.: WO2013/011560
PCT Pub. Date: Jan. 24, 2013

(65) Prior Publication Data
US 2014/0145697 A1  May 29, 2014

(51) Int. Cl.
*G05F 1/00* (2006.01)
*H02J 1/10* (2006.01)
(Continued)

(52) U.S. Cl.
CPC ......... *H02M 3/157* (2013.01); *H01M 8/04373* (2013.01); *H01M 8/04619* (2013.01);
(Continued)

(58) Field of Classification Search
CPC .. H02M 3/157; H02M 3/158; H02M 3/1584; H02M 2001/0022; H02M 2001/327; H02M 2001/0067; H02M 2001/007; H02M 2001/0074; H02M 2001/0077; H02M 1/32; H02M 2003/1586; H02M 7/493; H02M 2001/0048; H01M 8/04619; H01M 8/04888; H01M 8/04917; H01M 8/04947; H01M 8/04313; H01M 8/0432; H01M 2250/20; H01M 8/04373; B60L 11/1881; B60L 11/1809; B60L 11/1811; B60L 11/1812; B60L 11/1814; B60L 11/1898; B60L 11/1888; Y02E 60/50; Y02T 90/32; Y02T 90/34; Y02B 70/1491
USPC ......... 363/34–37, 40, 41, 50, 52, 53, 65–72, 363/74, 76–79, 87, 123–129; 323/222–226, 323/265, 266, 268–276, 282–286, 299–303, 323/351, 907; 318/800–806; 307/151
See application file for complete search history.

(56) References Cited

U.S. PATENT DOCUMENTS

| | | | |
|---|---|---|---|
| 2010/0124082 A1* | 5/2010 | Lee et al. | 363/46 |
| 2011/0051479 A1 | 3/2011 | Breen et al. | |
| 2011/0156687 A1* | 6/2011 | Gardner et al. | 323/284 |

FOREIGN PATENT DOCUMENTS

| | | | |
|---|---|---|---|
| JP | 2004-201463 A | 7/2004 | |
| JP | 2007-116834 A | 5/2007 | |

(Continued)

OTHER PUBLICATIONS

JP 2007-116834 (English translation).*
(Continued)

*Primary Examiner* — Timothy J Dole
*Assistant Examiner* — Carlos Rivera-Perez
(74) *Attorney, Agent, or Firm* — Kenyon & Kenyon LLP

(57) ABSTRACT

The step-up converter includes the plurality of converting units, each having the reactor and the semiconductor element part having electronic parts such as the transistor and the diodes. The ECU performs changeover control of increase or decrease of the number of drive phases of the converting units, based on the output condition from the fuel cell, the temperature condition of the reactor, and the temperature condition of the semiconductor element part.

9 Claims, 8 Drawing Sheets

(51) Int. Cl.
 *H02M 3/157*  (2006.01)
 *H02M 3/158*  (2006.01)
 *H01M 8/04*  (2016.01)
 *B60L 11/18*  (2006.01)
 *H02M 1/00*  (2006.01)
 *H02M 1/32*  (2007.01)

(52) U.S. Cl.
 CPC ..... *H01M8/04888* (2013.01); *H01M 8/04917* (2013.01); *H01M 8/04947* (2013.01); *H02M 1/32* (2013.01); *H02M 3/1584* (2013.01); *B60L 11/1881* (2013.01); *H01M 2250/20* (2013.01); *H02M 2001/0022* (2013.01); *H02M 2001/0048* (2013.01); *H02M 2001/327* (2013.01); *Y02B 70/1491* (2013.01); *Y02E 60/50* (2013.01); *Y02T 90/32* (2013.01); *Y02T 90/34* (2013.01)

(56) References Cited

FOREIGN PATENT DOCUMENTS

JP 2007-159315 A 6/2007
WO 2010/140255 A1 12/2010

OTHER PUBLICATIONS

WO-2010140255 (English translation).*
JP-2004201463 (English translation).*

* cited by examiner

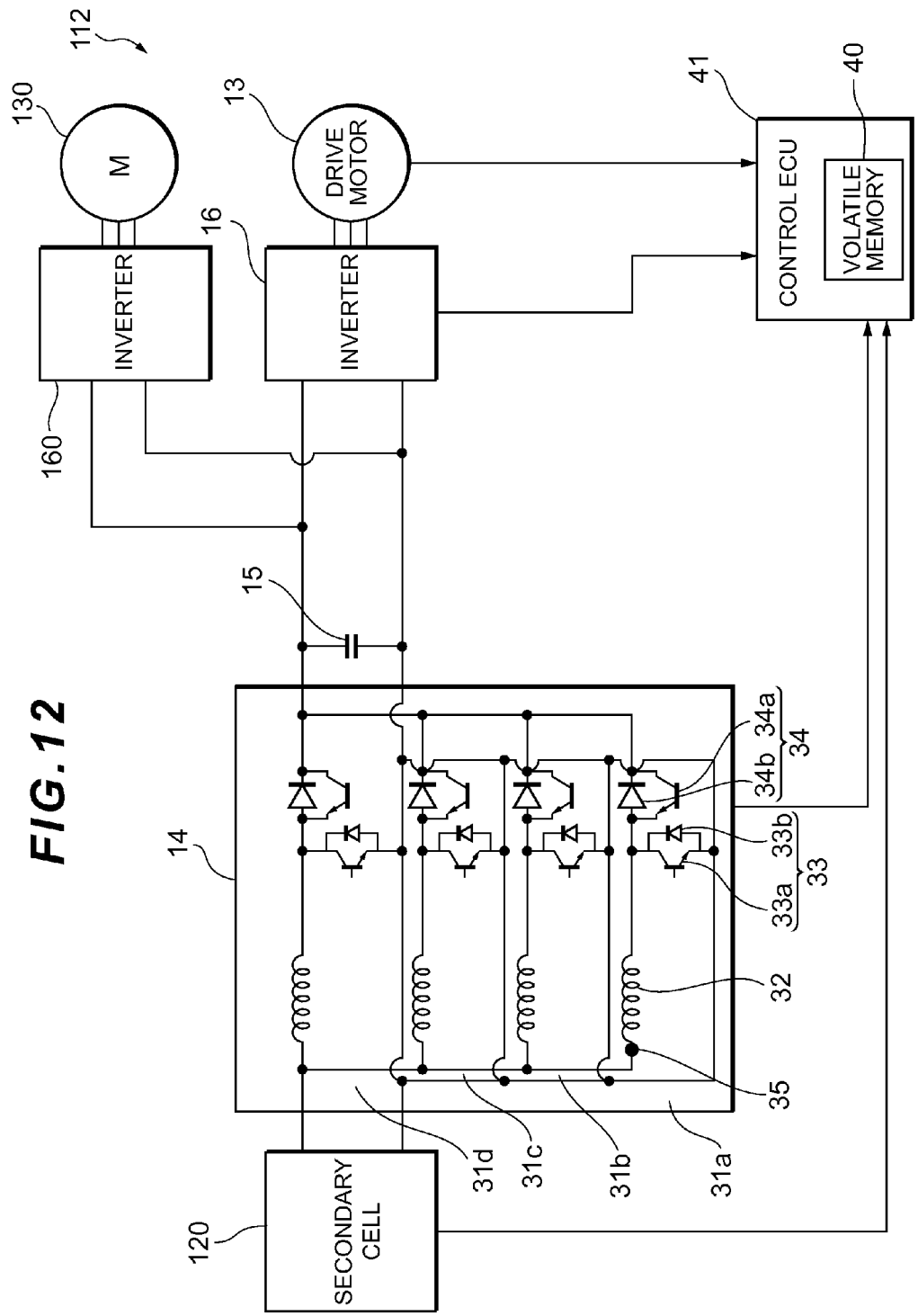

STEP-UP CONVERTER FOR BOOSTING VOLTAGE FROM A POWER SOURCE SYSTEM

CROSS-REFERENCE TO RELATED APPLICATIONS

This is a national phase application based on the PCT International Patent Application No. PCT/JP2011/066348 filed on Jul. 19, 2011, the entire contents of which are incorporated herein by reference.

BACKGROUND

The present invention relates to a power source system including a power source and a multiphase converter.

Among vehicles that include an electric motor, for example, there are vehicles including a multiphase converter for converting a voltage. As a method of controlling the multiphase converter that includes a plurality of phases of which a controlled volume can be independently changed, a detecting device that detects a state of each phase such as a volume of current passing through each phase and a temperature in each phase, and a control unit that supplies a control signal for specifying a control volume relative to each phase, there is known a method of supplying a control signal for correcting the control volume for each phase based on a state of each phase detected by the detecting device (see Patent Document 1, for example). In this system, an efficient operation can be performed by increasing a passing volume of current as far as possible according to this state.

Patent Document 1: Patent Publication JP-A-2007-159315

However, when only efficiency is taken into account, a reactor and a semiconductor element part which includes electronic parts that constitute the multiphase converter become at excessively high temperatures.

Therefore, increasing the efficiency as far as possible is required while protecting the configuration parts of the multiphase converter, such as the reactor and the semiconductor part.

SUMMARY

With the foregoing in view, it is an object of the present invention to provide a power source system capable of improving high efficiency while protecting configuration parts.

To achieve the above object, the power source system of the present invention has a power source for generating power by an electrochemical reaction between a fuel gas and an oxidation gas, a step-up converter that boosts power from the power source, and a control unit that performs output control of the step-up converter, wherein the step-up converter is a multiphase converter including a plurality of converting units each having a reactor and a semiconductor element part, and the control unit performs changeover control of increase or decrease of a number of drive phases of the converting units, based on an output condition of the power source, a temperature condition of the reactor, and a temperature condition of the semiconductor element part.

According to the power source system of such a configuration, the step-up converter configured by the multiphase converter having the plurality of converting units can meet large current of the power source. Moreover, the changeover control of increase or decrease of the number of drive phases of the converting units of the step-up converter is performed based on not only the output condition of the power source but also the temperature conditions of the reactor and the semiconductor element part that configure the converting unit. Therefore, the step-up converter can be driven in high efficiency while protecting the configuration parts such as the reactor and the electronic parts of the semiconductor element part.

Further, in the power source system of the present invention, the control unit may be configured to increase the number of drive phases of the converting units when an output from the power source becomes a predetermined increase changeover output, or when the reactor is at a predetermined increase changeover temperature, or when the semiconductor element part is at a predetermined increase changeover temperature.

Further, in the power source system of the present invention, the control unit may be configured to decrease the number of drive phases of the converting units when the output from the power source becomes a predetermined decrease changeover output, and when the reactor is at a predetermined decrease changeover temperature, and further when the semiconductor element part becomes at a predetermined decrease changeover temperature.

Further, in the power source system of the present invention, a changeover timing when the number of drive phases of the converting units is decreased may be configured to be offset to a timing at which an output or a temperature is lower than that at a changeover timing when the number of drive phases of the converting units is increased.

Further, in the power source system of the present invention, the control unit may be configured to perform changeover control of the number of drive phases of the converting units while maintaining the current flowing to the step-up converter at a predetermined current command value.

Further, in the power source system of the present invention, the control unit may be configured to set as a maximum deviation phase a phase of a converting unit that is changed over to drive or non-drive following changeover of the number of drive phases of the converting units, and increase or decrease the current value of the maximum deviation phase at a predetermined change rate at a changeover control time.

Further, in the power source system of the present invention, the control unit may be configured to control the output of the converting unit at a predetermined change rate at a time point when the semiconductor element part or the reactor becomes at a limit start temperature that is set in advance.

Further, in the power source system of the present invention, the system may be configured such that a part of the plurality of converting units is provided with a temperature sensor for detecting a temperature of the reactor, and that a limit start temperature of a converting unit in which the temperature sensor is provided is obtained from a heat resistant temperature of the reactor, and a limit start temperature of a converting unit in which the temperature sensor is not provided is a temperature obtained by subtracting a temperature variation due to a variation of a characteristic of the reactor from a heat resistant temperature of the reactor.

According to the power source system of the present invention, high efficiency can be achieved while protecting configuration parts.

DESCRIPTION OF DRAWINGS

FIG. 12 is a schematic circuit diagram of a power source system according to still another embodiment of the present invention.

DETAILED DESCRIPTION

Hereinafter, a power source system according to an embodiment of the present invention is described with reference to the appended drawings. In the present embodiment, the power source system according to the present invention which is used as a vehicle-mounted power generation system of a fuel cell hybrid vehicle (FCHV) is described.

A configuration of a fuel cell system in the present embodiment is described with reference to FIG. 1.

Figure 1:
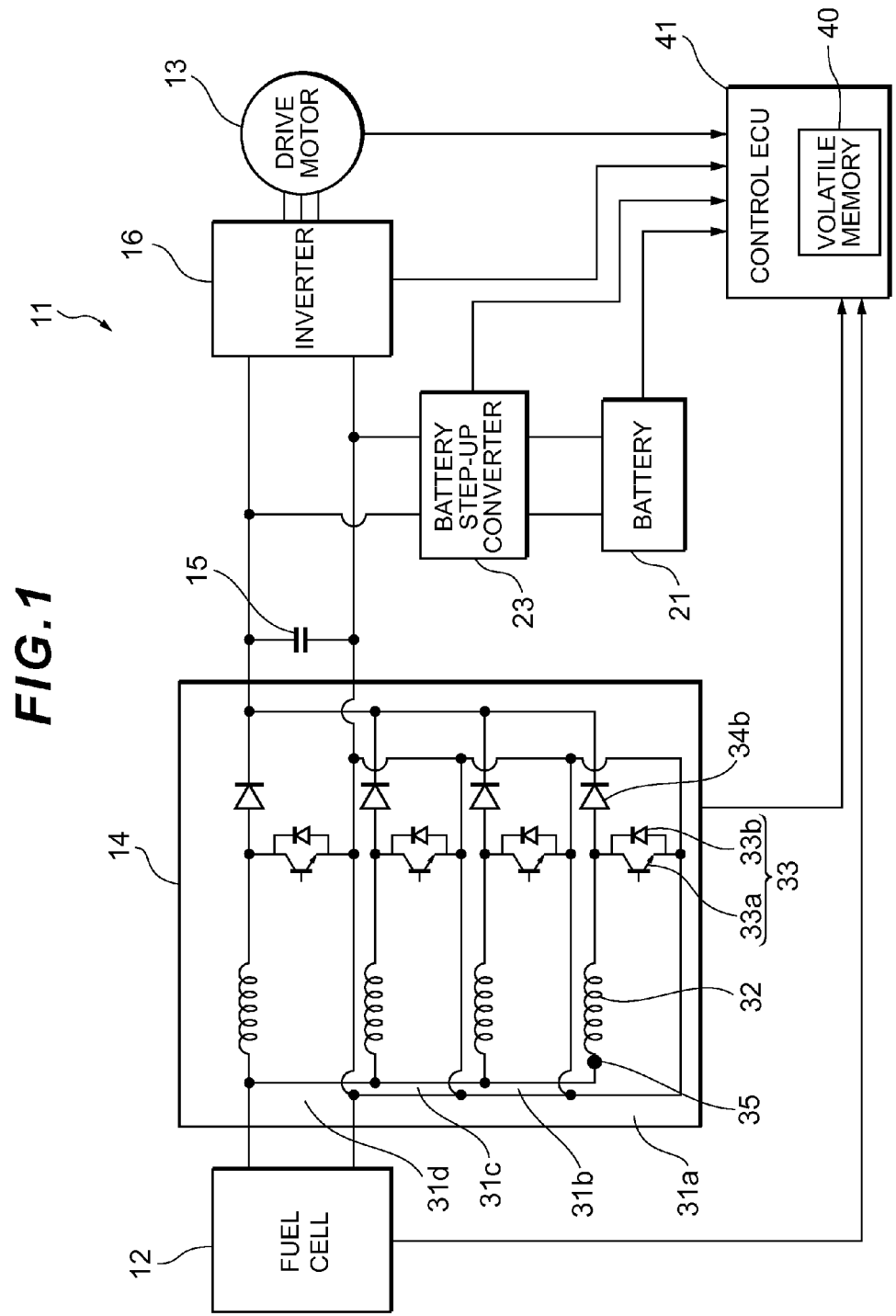
FIG. 1 is a schematic circuit diagram of a power source system according to an embodiment of the present invention.

As shown in FIG. 1, a fuel cell system 11 includes a fuel cell 12 that generates power by an electrochemical reaction between an oxidation gas and a fuel gas as reactant gases.

The fuel cell 12 is a polymer electrolyte fuel cell, for example, which has a stacked structure having many unit cells stacked. A unit cell has an air electrode on one surface and has a fuel electrode on the other surface of an electrolyte made of an ion exchange membrane, and is further structured to have a pair of separators that sandwich the air electrode and the fuel electrode from both sides. In this case, a hydrogen gas is supplied to a hydrogen gas passage of one separator, and air as an oxidation gas is supplied to an oxidation gas passage of the other separator. Power is generated based on a chemical reaction between these reactive gases.

The fuel cell 12 is connected to a drive motor (a drive source, a load) 13 for running a vehicle, and supplies power to the drive motor 13. A power supply path from the fuel cell 12 to the drive motor 13 is connected with an FC step-up converter (a step-up converter) 14, a capacitor 15, and a drive inverter 16 in this order from a fuel cell 12 side.

In this way, in the fuel cell system 11, the power generated by the fuel cell 12 is boosted by the FC step-up converter 14, and is supplied to the drive motor 13 via the drive inverter 16.

The FC step-up converter 14 is a multiphase converter as a converter having many phases, and includes a plurality (four in the present example, but the number of phases is not limited to four) of converting units 31a to 31d. Each of the converting units 31a to 31d includes a reactor 32, a switching element 33 having a transistor 33a and a diode 33b, and a diode 34b. A thermistor (a temperature sensor) 35 is provided in one converting unit 31a.

The drive motor 13 is a three-phase AC motor, for example, and the drive inverter 16 conned to the drive motor 13 converts direct current into three-phase alternating current, and supplies the three-phase alternating current to the drive motor 13.

The fuel cell system 11 also includes a battery 21 for supplying power to the drive motor 13. A power supply path from the battery 21 to the drive motor 13 is connected with a battery step-up converter 23. The fuel cell system according to the present invention may be configured not to include the battery step-up converter 23.

The power supply path of the battery 21 is connected to the power supply path of the fuel cell 12, and the power from the battery can be supplied from the battery 21 to the drive motor 13.

The battery step-up converter 23 of the present embodiment is a direct-current voltage converter, and has a function of adjusting and outputting a direct-current voltage that is input from the battery 21, to a drive motor 13 side, and a function of adjusting and outputting a direct-current voltage that is input from the fuel cell 12 or the drive motor 13, to the battery 21. Charge and discharge by the battery 21 is realized by these functions of the battery step-up converter 23. Further, an output voltage of the fuel cell 12 is controlled by the battery step-up converter 23. The battery 21 is configured to be able to charge surplus power and supply power as supplement.

The fuel cell system 11 includes an ECU (a control unit) 41 that has a volatile memory 40. The ECU 41 is connected with the fuel cell 12, the FC step-up converter 14, the battery 21, the battery step-up converter 23, the drive inverter 16, and the drive motor 13. The ECU 41 controls the fuel cell 12, the FC step-up converter 14, the battery 21, the battery step-up converter 23, the drive inverter 16, and the drive motor 13. To the ECU 41, a signal of a detected temperature from the thermistor 35 provided in the converting unit 31a of the FC step-up converter 14 is supplied. Then, the ECU 41 controls outputs of the converting units 31a to 31d that configure the FC step-up converter 14, based on the detected temperature from the thermistor 35 of the converting unit 31a. In each of the converting units 31a to 31d, a temperature sensor (not shown) is provided in the semiconductor element part including the switching element 33 and the diode 34b. Detected temperatures of these temperature sensors are transmitted to the ECU 41.

Control of the converting units 31a to 31d by the ECU 41 is described next. Control of the step-up converter by the control unit of the fuel cell system according to the present invention includes at least output control of the step-up converter, changeover control of the number of drives of a plurality of converting units, that is, changeover control of the number of drive phases of the step-up converter.

First, control relating to a reference example is described.

Reference Example

Figure 2:
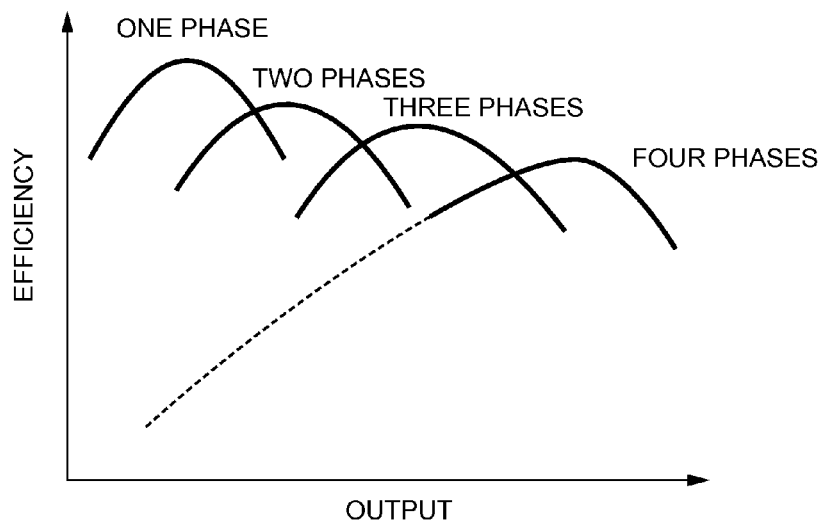
FIG. 2 is a graph showing a general relationship between an output and efficiency of a multiphase converter in a reference example.

FIG. 2 shows a relationship between an output and efficiency of a multiphase converter. In the multiphase converter as a converter of many phases, instead of normally driving the converting units 31a to 31d of a plurality of phase as indicated by a broken line in FIG. 2, total efficiency can be increased by changing over the number of drive phases so as to increase the drive phases one by one at each time of increase of output, as indicated by solid lines in FIG. 2.

However, when an operation is performed by taking only efficiency into account as described above, the reactor 32 or the semiconductor element part including the switching element 33 and the like that configures a system sometimes becomes at an excessively high temperature.

Next, control relating to the present embodiment is described.

In the present embodiment, the number of drive phases of the converting units 31a to 31d of a plurality of phases is changed over in the following conditions.

(1) A Changeover Condition Based on an Output Command Value

The changeover condition based on an output command value is a condition that takes efficiency into account, and changeover control of the number of drive phases of the converting units 31a to 31d is performed based on the output command value transmitted from a high-order control unit.

Figure 3:
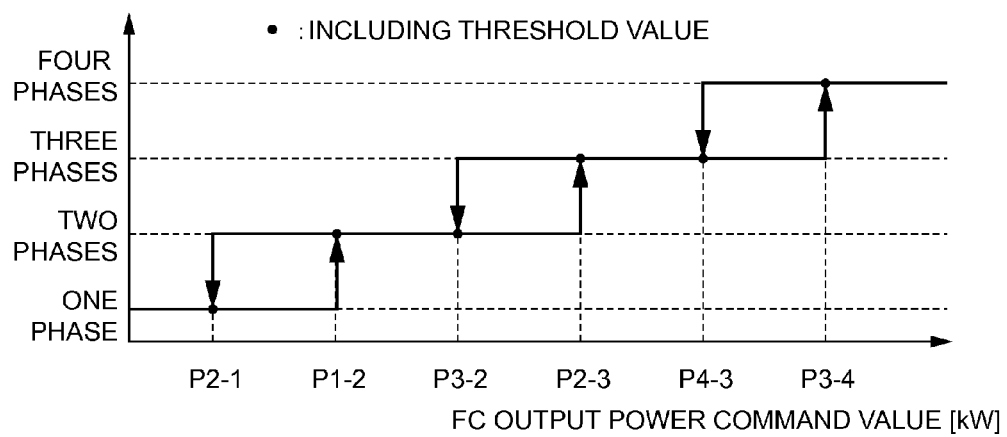
FIG. 3 is a graph for explaining a changeover condition based on an output command value.

Specifically, as shown in FIG. 3, increase changeover outputs P1-2, P2-3, and P3-4 are set in advance. In a state that the converting unit 31a of one phase is driven, when the output command value becomes P1-2, the drive is changed over to drive of the converting units 31a and 31b of two phases. Further, when the output command value becomes P2-3, the drive is changed over to drive of the converting units 31a, 31b, and 31c of three phases. When the output command value becomes P3-4, the drive is changed over to drive of the converting units 31a, 31b, 31c, and 31d of four phases.

Further, decrease changeover outputs P4-3, P3-2, and P2-1 are set in advance. In a state that the converting units 31a, 31b, 31c, and 31d of four phases are driven, when the output command value decreases and when the output command value becomes P4-3, the drive is changed over to drive of the converting units 31a, 31b, and 31c of three phases. Further, when the output command value becomes P3-2, the drive is changed over to drive of the converting units 31a and 31b of two phases. When the output command value becomes P2-1, the drive is changed over to drive of the converting unit 31a of one phase.

At an increase time and a decrease time of the number of phases, the output command values that become changeover timings of the number of phases are set as follows.

P1-2>P2-1, P2-3>P3-2, P3-4>P4-3

With this setting, a hysteresis is provided at the increase time and the decrease time of the number of phases, and hunting of control can be suppressed.

By performing changeover control of the number of drive phases of the converting units 31a, 31b, 31c, and 31d, the FC step-up converter 14 can be drive in high efficiency.

(2) A Changeover Condition Based on a Reactor Temperature

The changeover condition based on a reactor temperature is a condition for keeping thermal rating of the reactor 32, and changeover control of the number of drive phases of the converting units 31a to 31d is performed based on a temperature of the reactor 32.

Figure 4:
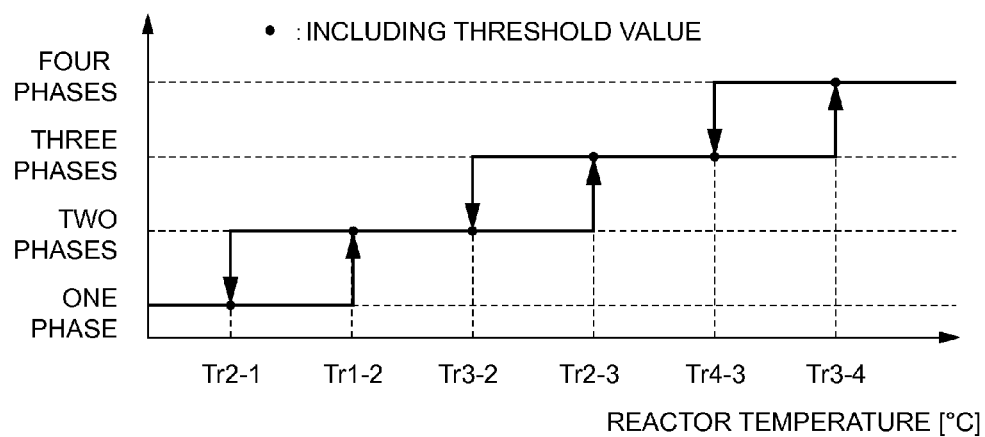
FIG. 4 is a graph for explaining a changeover condition based on a reactor temperature.

Specifically, as shown in FIG. 4, increase changeover temperatures Tr1-2, Tr2-3, and Tr3-4 are set in advance. In a state that the converting unit 31a of one phase is driven, when the reactor 32 becomes at the changeover temperature Tr1-2, the drive is changed over to drive of the converting units 31a and 31b of two phases. Further, when the reactor 32 becomes at the changeover temperature Tr2-3, the drive is changed over to drive of the converting units 31a, 31b, and 31c of three phases. When the reactor 32 becomes at the changeover temperature Tr3-4, the drive is changed over to drive of the converting units 31a, 31b, 31c, and 31d of four phases.

Further, decrease changeover temperatures Tr4-3, Tr3-2, and Tr2-1 are set in advance. In a state that the converting units 31a, 31b, 31c, and 31d of four phases are driven, when a temperature of the reactor 32 decreases to become the changeover temperature Tr4-3, the drive is changed over to drive of the converting units 31a, 31b, and 31c of three phases. Further, when the reactor 32 becomes at the changeover temperature Tr3-2, the drive is changed over to drive of the converting units 31a and 31b of two phases. When the reactor 32 becomes at the changeover temperature Tr2-1, the drive is changed over to drive of the converting unit 31a of one phase.

At an increase time and a decrease time of the number of phases, the changeover temperatures of the reactor 32 that become changeover timings of the number of phases are set as follows.

Tr1-2>Tr2-1, Tr2-3>Tr3-2, Tr3-4>Tr4-3

With this setting, a hysteresis is provided at the increase time and the decrease time of the number of phases, and hunting of control can be suppressed.

Either one of the temperatures of Tr1-2 and Tr3-2 may be higher or both temperatures may be the same, and either one of the temperatures of Tr2-3 and Tr4-3 may be higher or both temperatures may be the same.

The changeover temperature Tr3-4 at which drive is changed over to the drive by the converting units 31a, 31b, 31c, and 31d of four phases is set to a temperature lower than a heat resistant temperature of the reactor 32.

By performing changeover control of the number of drive phases of the converting units 31a, 31b, 31c, and 31d in this condition, the reactor 32 can be maintained at a lower temperature than the heat resistant temperature, and thermal rating can be kept.

The changeover temperature Tr3-4 (a thermal rating temperature) is set so that the reactor 32 can be driven without trouble and without reaching a heat resistant temperature even when the reactor 32 is driven for about 30 seconds at a maximum output after reaching the changeover temperature Tr3-4.

In the above condition, for the temperature of the reactor 32, by using the thermistor (the temperature sensor) 35 provided in the converting unit 31a of one phase, the temperature of the reactor 32 of the converting unit 31a in which the thermistor 35 is provided is used as a representative. With this configuration, cost can be substantially reduced as compared with cost in the case of having the thermistor 35 provided in all the converting units 31a to 31d.

(3) A Changeover Condition Based on a Semiconductor Element Part Temperature

The changeover condition based on a semiconductor element part temperature is a condition to keep thermal rating of the semiconductor element part including the switching element 33 and the diode 34b, and changeover control of the number of drive phases of the converting units 31a to 31d is performed based on a temperature of the semiconductor element part.

Figure 5:
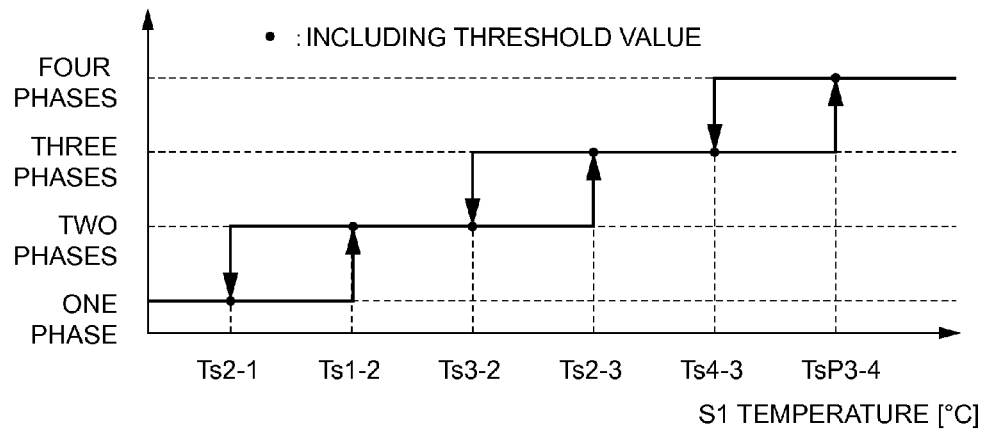
FIG. 5 is a graph for explaining a changeover condition based on a semiconductor element part temperature.

Specifically, as shown in FIG. 5, increase changeover temperatures Ts1-2, Ts2-3, and Ts3-4 are set in advance. In a state that the converting unit 31a of one phase is driven, when the semiconductor element part becomes at the changeover temperature Ts1-2, the drive is changed over to drive of the converting units 31*a* and 31*b* of two phases. Further, when the semiconductor element part becomes at the changeover temperature Ts2-3, the drive is changed over to drive of the converting units 31*a*, 31*b*, and 31*c* of three phases. When the semiconductor element part becomes at the changeover temperature Ts3-4, the drive is changed over to drive of the converting units 31*a*, 31*b*, 31*c*, and 31*d* of four phases.

Further, decrease changeover temperatures Ts4-3, Ts3-2, and Ts2-1 are set in advance. In a state that the converting units 31*a*, 31*b*, 31*c*, and 31*d* of four phases are driven, when a temperature of the semiconductor element part decreases and when the semiconductor element part becomes at the changeover temperature Ts4-3, the drive is changed over to drive of the converting units 31*a*, 31*b*, and 31*c* of three phases. Further, when the semiconductor element part becomes at the changeover temperature Ts3-2, the drive is changed over to drive of the converting units 31*a* and 31*b* of two phases. When the semiconductor element part becomes at the changeover temperature Ts2-1, the drive is changed over to drive of the converting unit 31*a* of one phase.

At an increase time and a decrease time of the number of phases, the changeover temperatures of the semiconductor element part that become changeover timings of the number of phases are set as follows.

Ts1-2>Ts2-1, Ts2-3>Ts3-2, Ts3-4>Ts4-3

With this setting, a hysteresis is provided at the increase time and the decrease time of the number of phases, and hunting of control can be suppressed.

Either one of the temperatures of Ts1-2 and Ts3-2 may be higher or both temperatures may be the same, and either one of the temperatures of Ts2-3 and Ts4-3 may be higher or both temperatures may be the same.

The changeover temperature Ts3-4 at which drive is changed over to the drive by the converting units 31*a*, 31*b*, 31*c*, and 31*d* of four phases is set to a temperature lower than a heat resistant temperature of the semiconductor element part.

By performing changeover control of the drive of the converting units 31*a*, 31*b*, 31*c*, and 31*d* in this condition, the semiconductor element part can be maintained at a lower temperature than the heat resistant temperature, and thermal rating can be kept.

In the above condition, a temperature of the semiconductor element part is a detected temperature transmitted from a temperature sensor provided in each semiconductor element part of each phase. In the above condition, a maximum temperature of detected temperatures from a temperature sensor of the semiconductor element part of each phase is used.

(4) A Changeover Condition Based on a Power Generation State

In starting the fuel cell 12, there is a case that power cannot be efficiently generated because of coldness, for example. In such a case, rapid warming-up by low-efficiency power generation is performed to warm up the fuel cell 12. The low-efficiency power generation refers to power generation with a smaller volume of a reactive gas (an oxidation gas, for example) supplied to the fuel cell 12 than that at the normal power generation time, and also with a larger power loss than that at the normal power generation time. In the low-efficiency power generation, the fuel cell 12 is driven in a state that an air stoichiometric ratio is narrowed down to near 1.0 (a theoretical value), for example.

Therefore, in such a rapid warming-up time, heat is generated by driving the converting units 31*a*, 31*b*, 31*c*, and 31*d* in four phase, in a state that the vehicle is stopped.

Changeover control of the converting units 31*a* to 31*d* by the ECU 41 based on the above drive conditions is described next.

(1) Control at the Time of Increasing the Number of Phases

Figure 6:
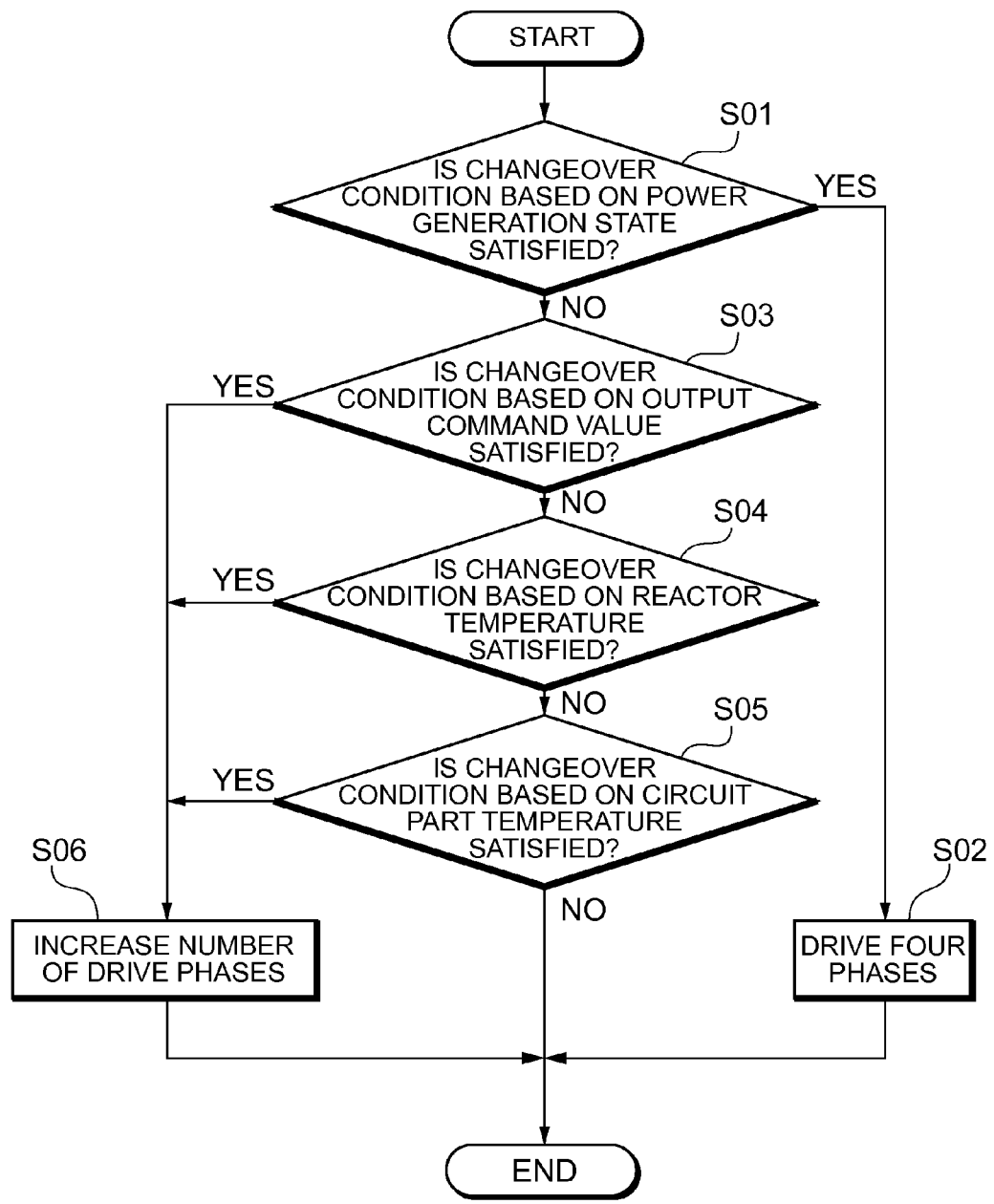
FIG. 6 is a flowchart for explaining changeover control of the number of phases at an increase time of the number of drive phases.

The control at the time of increasing the number of phases from one phase to two phases, from two phases to three phases, and from three phases to four phases is described along a flowchart shown in FIG. 6.

First, based on a temperature detected by a temperature sensor provided in the fuel cell 12, it is determined whether a changeover condition based on a power generation state is satisfied (step S01).

When it is determined that the changeover condition based on the power generation state is satisfied (step S01: Yes), that is, when the fuel cell 12 needs to be driven below the freezing point, for example, all four phases of the converting units 31*a*, 21*b*, 31*c*, and 31*d* are driven (step S02). Accordingly, the fuel cell 12 is rapidly warmed up, and efficiency of a subsequent operation is improved.

When it is determined that the changeover condition based on the power generation state is not satisfied (step S01: No), it is determined whether a changeover condition based on an output command value is satisfied (step S03).

When it is determined that the changeover condition based on the output command value is satisfied (step S03: Yes), drive is changed over from that by the present number of phases to drive by the number of phases by adding one phase (step S06).

When it is determined that the changeover condition based on the output command value is not satisfied (step S03: No), it is determined whether a changeover condition based on a reactor temperature is satisfied (step S04).

When it is determined that the changeover condition based on the reactor temperature is satisfied (step S04: Yes), drive is changed over from that by the present number of phases to drive by the number of phases by adding one phase (step S06).

When it is determined that the changeover condition based on the reactor temperature is not satisfied (step S04: No), it is determined whether a changeover condition based on a semiconductor element part temperature is satisfied (step S05).

When it is determined that the changeover condition based on the semiconductor element part temperature is satisfied (step S05: Yes), drive is changed over from that by the present number of phases to drive by the number of phases by adding one phase (step S06).

(2) Control at the Time of Decreasing the Number of Phases

Figure 7:
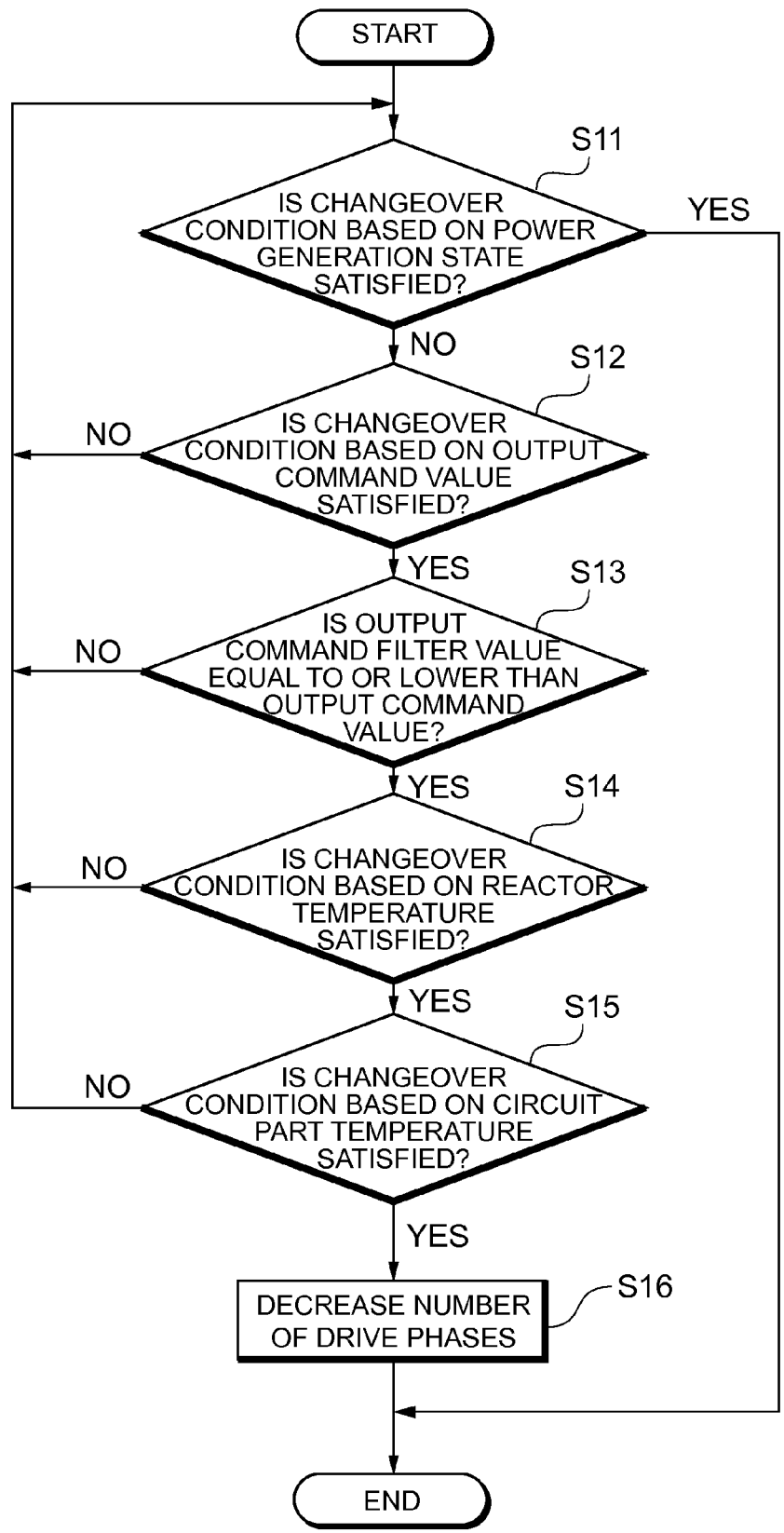
FIG. 7 is a flowchart for explaining changeover control of the number of phases at a decrease time of the number of drive phases.

The control at the time of decreasing the number of phases from four phases to three phases, from three phases to two phases, and from two phases to one phase is described along a flowchart shown in FIG. 7.

First, it is determined whether a changeover condition based on a power generation state is satisfied (step S11).

When it is determined that the changeover condition based on the power generation state is not satisfied (step S11: No), it is determined whether a changeover condition based on an output command value is satisfied (step S12).

When it is determined that the changeover condition based on the output command value is satisfied (step S12:

Yes), it is determined whether an output command filter value is equal to or lower than the output command value (step S13).

The output command filter value is an output value obtained by measuring the output from the fuel cell 12 by a sensor.

When it is determined that the output command filter value is equal to or lower than the output command value (step S13: Yes), it is determined whether a changeover condition based on a reactor temperature is satisfied (step S14).

When it is determined that the changeover condition based on the reactor temperature is satisfied (step S14: Yes), it is determined whether a changeover condition based on a semiconductor element part temperature is satisfied (step S15).

When it is determined that the changeover condition based on the semiconductor element part temperature is satisfied (step S15: Yes), drive is changed over from that by the present number of phases to drive by the number of phases by subtracting one phase (step S16).

In the present embodiment, the following control is performed together with the changeover of the number of phases of the FC step-up converter 14.

(1) Load Rate Limit Control

In the load rate limit control, limit of a load rate that takes drivability into account is performed.

The load rate that is limited by the load rate limit control is derived for each of a semiconductor element part temperature and a reactor temperature.

(A Load Rate A Based on a Semiconductor Element Part Temperature)

Figure 8:
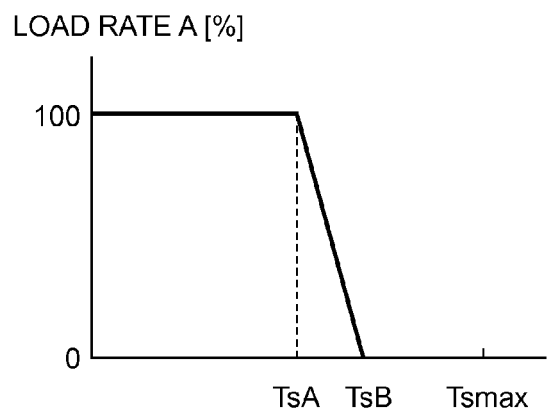
FIG. 8 is a graph showing a relationship between a temperature and a load rate of the semiconductor element part.

FIG. 8 shows the load rate A of the semiconductor element part of the converting unit 31a in which the thermistor 35 is provided. As shown in FIG. 8, the load rate A is limited at a change rate that takes drivability into account, from a time point when a temperature of the semiconductor element part reaches a limit start temperature TsA until the temperature becomes a standard heat resistant temperature TsB. The standard heat resistant temperature TsB is set at a sufficiently lower temperature than a specification heat resistant temperature Tsmax.

(A Load Rate B Based on a Reactor Temperature)

Figure 9:
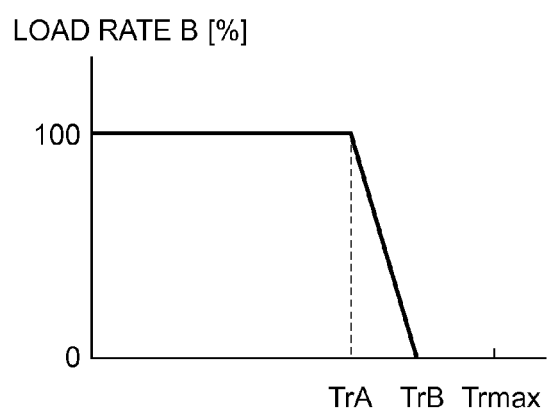
FIG. 9 is a graph showing a relationship between a temperature and a load rate of a reactor in which a thermistor is provided.

FIG. 9 shows the load rate B of the reactor 32 of the converting unit 31a in which the thermistor 35 is provided. As shown in FIG. 9, the load rate B is for performing output limit at a change rate that takes drivability into account, from a time point when a temperature detected by the thermistor 35 provided in the reactor 32 reaches a limit start temperature TrA until the temperature becomes a standard heat resistant temperature TrB. The standard heat resistant temperature TrB is set at a sufficiently lower temperature than a specification heat resistant temperature Trmax.

(A Load Rate C Based on a Reactor Temperature)

Figure 10:
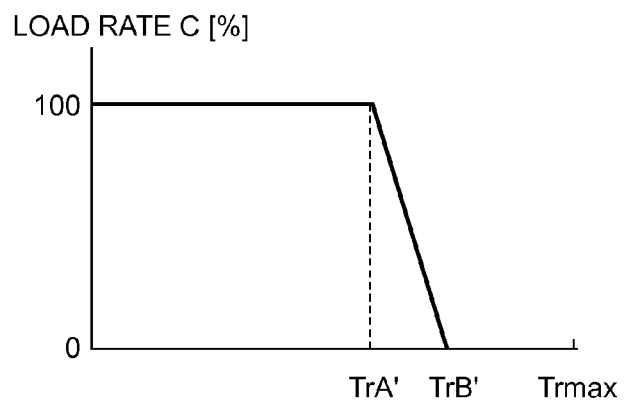
FIG. 10 is a graph showing a relationship between a temperature and a load rate of a reactor in which a thermistor is not provided.

FIG. 10 shows the load rate C of the reactors 32 of the converting units 31b, 31c, and 31d in which the thermistor 35 is not provided. As shown in FIG. 10, the load rate C is for performing output limit at a change rate that takes drivability into account, from a time point when a temperature detected by the thermistor 35 provided in the reactor 32 reaches a limit start temperature TrA' until the temperature becomes a standard heat resistant temperature TrB'.

The standard heat resistant temperature TrB' is set at a sufficiently lower temperature than the specification heat resistant temperature Trmax, by further taking into account a temperature variation of the specification heat resistant temperature Trmax attributable to a variation of characteristics such as a heat generation characteristic of the reactor 32. That is, the standard heat resistant temperature TrB' of the reactors 32 of the converting units 31b, 31c, and 31d in which the thermistor 35 is not provided is set at a temperature lower by the temperature variation than the standard heat resistant temperature TrB of the reactors 32 of the converting unit 31a in which the thermistor 35 is provided.

Then, a load rate L1 of the converting unit 31a in which the thermistor 35 is provided is determined by selecting a lower one of the load rate A and the load rate B. A load rate L2 of the converting units 31b, 31c, and 31d in which the thermistor 35 is not provided is determined by selecting a lower one of the load rate A and the load rate C.

(2) Setting of a Maximum Output Upper Limit

A maximum output upper limit Pmax that can be output from the fuel cell 12 to the FC step-up converter 14 is calculated, and the input to the FC step-up converter 14 is limited.

The maximum output upper limit Pmax is obtained from a total of maximum outputs Pamax, Pbmax, Pcmax, and Pdmax respectively from the converting units 31a to 31d, as shown in the following equation.

$$Pmax = Pamax + Pbmax + Pcmax + Pdmax$$

The respective maximum outputs Pamax, Pbmax, Pcmax, and Pdmax of the converting units 31a to 31d are obtained as follows.

The maximum output Pamax of the converting unit 31a in which the thermistor 35 is provided and the maximum outputs Pbmax, Pcmax, and Pdmax of the converting units 31b to 31d in which the thermistor 35 is not provided are obtained from the load rates L1 and L2 and a design maximum output value Ps of the converting units 31b to 31d, based on the following equations.

$$Pamax = L1 \times Ps$$

$$Pbmax = L2 \times Ps$$

$$Pcmax = L2 \times Ps$$

$$Pdmax = L2 \times Ps$$

The ECU 41 transmits the maximum output upper limit Pmax to a high-order control unit, and causes the output command value from the high-order control unit to be suppressed within the maximum output upper limit Pmax, and can protect the reactors 32 and the semiconductor element parts of the converting units 31a to 31d.

When the output command value exceeds the maximum output upper limit Pmax, the ECU 41 compensates for a shortage of the output from the battery 21. When the compensation from the battery 21 is not sufficient for the output, the ECU 41 limits the output.

(3) Setting of a Maximum Current Limit

A maximum current upper limit Imax that can be output from the fuel cell 12 to the FC step-up converter 14 is calculated, and the input to the FC step-up converter 14 is limited.

The maximum current upper limit Imax is obtained from a total of maximum current Iamax, Ibmax, Icmax, and Idmax respectively from the converting units 31a to 31d, as shown in the following equation.

$$Imax = Iamax + Ibmax + Icmax + Idmax$$

The maximum current Iamax, Ibmax, Icmax, and Idmax of the converting units 31a to 31d are obtained as follows.

The maximum current Iamax of the converting unit 31a in which the thermistor 35 is provided and the maximum current Ibmax, Icmax, and Idmax of the converting units 31b to 31d in which the thermistor 35 is not provided are obtained from the load rates L1 and L2 and a design maximum current value Is of the converting units 31b to 31d, based on the following equations.

$$Iamax = L1 \times Is$$

$$Ibmax = L2 \times Is$$

$$Icmax = L2 \times Is$$

$$Idmax = L2 \times Is$$

The ECU 41 transmits the maximum current upper limit Imax to a high-order control unit, and causes a current command value from a high-order control unit to be suppressed to not more than the maximum current upper limit Imax, and can protect the reactors 32 and the semiconductor element parts of the converting units 31a to 31d.

When a current command value exceeds the maximum current upper limit Imax, the ECU 41 controls to compensate for a shortage of current from the battery 21. When the compensation from the battery 21 is not yet sufficient for the current, the ECU 41 limits the current.

(4) Setting of Target Current

Target current Ia to Id of the converting units 31a to 31d are set.

In the setting of the target current, either a value obtained by dividing a current command value from a high-order control unit by the number of drive phase, or a maximum current value of the converting unit in the drive state out of the maximum current Iamax to Idmax of the converting units 31a to 31d, whichever is lower, is selected and set as the target current of the converting unit in the drive state out of the converting units 31a to 31d.

The target currents of the converting units in a non-drive state out of the converting units 31a to 31d are set as "0".

(5) Setting of a Current Command Value (Deriving of a Maximum Deviation Phase)

First, the ECU 41 obtains a maximum deviation phase that is largest out of deviations of the converting units 31a to 31d.

The deviations of the converting units 31a to 31d are obtained from the following equation.

A deviation of each phase=|a current target value of each phase−a current command value of each phase|

There is a case that a deviation of each phase is the same. Therefore, a priority order is provided in each phase (for example, 31a>31b>31c>31d). When the deviations become the same, a maximum deviation phase is derived based on the priority orders.

When a drive command of each phase is set in an off state, the drive phase is not included in phases from which a maximum deviation phase is obtained. Preferably, the maximum deviation phase is set to be able to be referred to from a RAM.

(Calculation of a Current Command Value)

In a current command value of a maximum deviation phase, a rate limit is set at the current increase time and the current decrease time, respectively. The rate limit is from a lower limit value 0 (A) to an upper limit value 125 (A), for example, and is ±5.0/1.0 (A/ms) at the current increase time and the current decrease time, respectively. The rate limit can be rewritten from an outside.

Current command values in other than a maximum deviation phase are calculated as follows.

(1) In the Case of Two-Phase Drive

In a state of two-phase drive of the converting units 31a and 31b, when the converting unit 31b is a maximum deviation phase, a current command value of the converting unit 31a is obtained from the following equation.

A current command value of the 31a phase=a current command value from a high-order control unit−a current command value of a maximum deviation phase (2) In the Case of Three-Phase Drive In a state of three-phase drive of the converting units 31a, 31b, and 31c, when the converting unit 31c is a maximum deviation phase, current command values of the converting units 31a and 31b are obtained from the following equations.

A current command value of the 31a phase=(a current command value from a high-order control unit−a current command value of a maximum deviation phase)+(maximum current of the 31a phase/(total of maximum current of the 31a phase and the 31b phase))

A current command value of the 31b phase=(a current command value from a high-order control unit−a current command value of a maximum deviation phase)+(maximum current of the 31b phase/(total of maximum current of the 31a phase and the 31b phase))

(3) In the Case of Four-Phase Drive

In a state of four-phase drive of the converting units 31a, 31b, 31c, and 31d, when the converting unit 31d is a maximum deviation phase, current command values of the converting units 31a, 31b, and 31c are obtained from the following equations.

A current command value of the 31a phase=(a current command value from a high-order control unit−a current command value of a maximum deviation phase)+(maximum current of the 31a phase/(total of maximum current of the 31a phase, the 31b phase, and the 31c phase))

A current command value of the 31b phase=(a current command value from a high-order control unit−a current command value of a maximum deviation phase)+(maximum current of the 31b phase/(total of maximum current of the 31a phase, the 31b phase, and the 31c phase))

A current command value of the 31c phase=(a current command value from a high-order control unit−a current command value of a maximum deviation phase)+(maximum current of the 31c phase/(total of maximum current of the 31a phase, the 31b phase, and the 31c phase))

When a drive command of each phase is set in an off state, a current command value of each phase is set to "0" in the drive phase.

At the time of changeover from four-phase drive to three-phase drive, when the converting unit 31d becomes a maximum deviation phase, when the rate limit is 5/1.0 (A/ms), and when a current command value from a high-order control unit is constant at 120 (A), for example, distribution of current to the phases of the converting units 31a to 31d becomes as shown in Table 1.

TABLE 1

| | Current command value from high order | | | | | | |
|---|---|---|---|---|---|---|---|
| | 120 | 120 | 120 | 120 | 120 | 120 | 120 |
| Current command value of 31a phase | 30 | 31.7 | 33.3 | 35.0 | 36.7 | 38.3 | 40 |

TABLE 1-continued

| | Current command value from high order | | | | | | |
|---|---|---|---|---|---|---|---|
| | 120 | 120 | 120 | 120 | 120 | 120 | 120 |
| Current command value of 31b phase | 30 | 31.7 | 33.3 | 35.0 | 36.7 | 38.3 | 40 |
| Current command value of 31c phase | 30 | 31.7 | 33.3 | 35.0 | 36.7 | 38.3 | 40 |
| Current command value of 31d phase | 30 | 25 | 20 | 15.0 | 10 | 5 | 0 |
| Total of current command values | 120 | 120 | 120 | 120 | 120 | 120 | 120 |

Flow of time →

In this way, when changeover control of the number of drive phases of the converting units 31a to 31d is performed while maintaining the current output from the step-up converter 14 at a predetermined current command value, the changeover of the number of drive phases can be performed smoothly without applying a large load to each of the converting units 31a to 31d. Particularly, by setting the rate limit to a maximum deviation phase in the converting units 31a to 31d, a converting unit that becomes the maximum deviation phase can be protected.

As described above, according to the fuel cell system of the present embodiment, the multiphase step-up converter 14 having the plurality of converting units 31a to 31d can meet large current of the fuel cell 12.

Because the changeover control of the increase or decrease of the number of drive phases of the converting units 31a to 31d of the step-up converter 14 is performed based on not only the output condition of the fuel cell 12 but also the temperature conditions of the reactor 32 and the semiconductor element part having electronic parts such as the transistor 33a and the diodes 33b and 34b that constitute the converting units 31a to 31d, the step-up converter 14 can be driven in high efficiency while protecting the reactor 32 and the configuration parts such as the electronic parts of the semiconductor element part.

In the above embodiment, although the power source system according to the present invention applied to a fuel cell system mounted on a fuel cell vehicle is described, the power source system according to the present invention can be also applied to various moving vehicles (such as electric vehicles, hybrid vehicles, robots, vessels, aircrafts, etc.) other than fuel cell vehicles. The power source system according to the present invention can be also applied to a stationary power generation system used as a power generation facility for constructions (houses, buildings, etc.).

Figure 11:
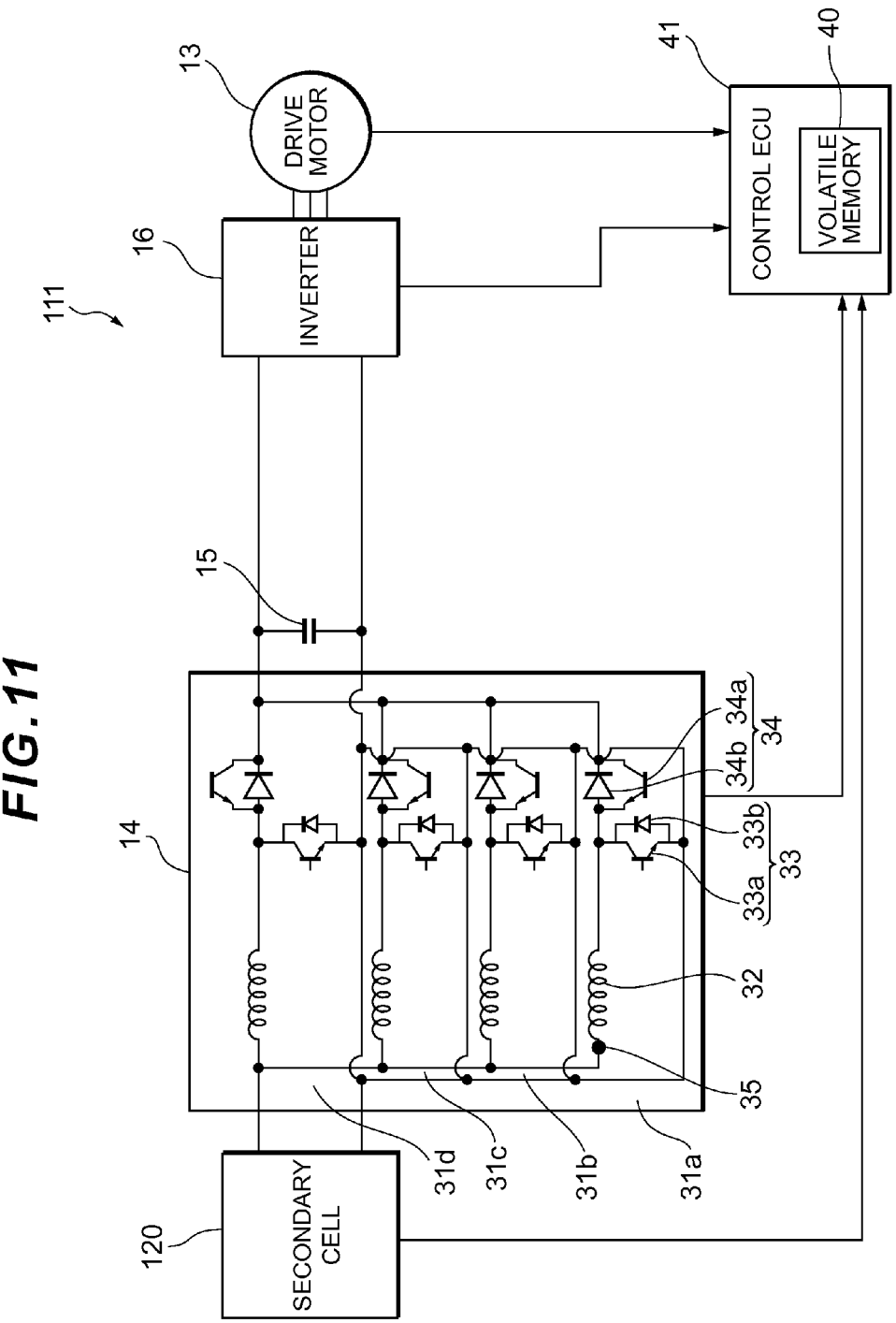
FIG. 11 is a schematic circuit diagram of a power source system according to another embodiment of the present invention.

FIG. 11 shows an example of the power source system according to the present invention applied to a power source system mounted on an electric vehicle (an EV vehicle). In FIG. 11, configuration elements that are the same as or similar to the configuration elements shown in FIG. 1 are attached with the identical reference symbols, and their descriptions are omitted.

A power source system 111 shown in FIG. 11 includes a secondary cell 120 in place of the fuel cell 12 in FIG. 1, and does not include the battery 21 and the battery step-up converter 23 in FIG. 1. In the power source system 111, the semiconductor element part in the present invention is configured by the switching element 33 having the transistor 33a and the diode 33b, and a second switching element 34 having a transistor 34a and a diode 34b. By including the semiconductor element part having such a configuration, a bidirectional converter capable of performing both step-up and step-down operations is realized unlike a unidirectional converter that can perform only a step-up operation shown in FIG. 1.

FIG. 12 shows one example of the power source system according to the present invention applied to a power source system mounted on a hybrid vehicle or on a plug-in hybrid vehicle to a secondary cell of which power can be directly charged from an external commercial power source. In FIG. 12, configuration elements that are the same as or similar to the configuration elements shown in FIG. 1 are attached with the identical reference symbols, and their descriptions are omitted.

A power source system 112 shown in FIG. 12 includes the secondary cell 120 in place of the fuel cell 12 in FIG. 1, and does not include the battery 21 and the battery step-up converter 23 in FIG. 1. The power source system 112 includes a motor 130 that mainly functions as a power generator and an inverter 160 that supplies power to the motor 130, in addition to the drive motor 13 that mainly functions as an electric motor and the drive inverter 16 that supplies power to the drive motor 13.

In the power source system 112, the semiconductor element part in the present invention is configured by the switching element 33 having the transistor 33a and the diode 33b, and the second switching element 34 having the transistor 34a and the diode 34b. By including the semiconductor element part having such a configuration, a bidirectional converter capable of performing both step-up and step-down operations is realized unlike the unidirectional converter that can perform only the step-up operation shown in FIG. 1.

11 Fuel cell system (power source system)
12 Fuel cell (power source)
14 FC step-up converter (step-up converter)
31a to 31d Converting unit
32 Reactor
33 Switching element (semiconductor element part)
33a Transistor (semiconductor element part)
33b Diode (semiconductor element part)
34 Switching element (semiconductor element part)
34a Transistor (semiconductor element part)
34b Diode (semiconductor element part)
35 Thermistor (temperature sensor)
41 ECU (control unit)
120 Secondary cell (power source)

I claim:

1. A power source system having a power source, a step-up converter for boosting voltage from the power source, and a control unit for performing output control of the step-up converter, wherein
the step-up converter is a multiphase converter including a plurality of converting units each having a reactor and a semiconductor element part, and
the control unit configured to:
perform changeover control of increase or decrease of a number of drive phases of the converting units, based on an output condition of the power source, a temperature condition of the reactor, and a temperature condition of the semiconductor element part,
perform changeover control of increase of a number of drive phases of the converting units when it is determined that an output power command of the power source satisfies a predetermined output condition, and
when it is determined that the output power command of the power source does not satisfy the predetermined output condition, the control unit is configured to determine whether a temperature of the reactor or a temperature of the semiconductor element part satisfies a predetermined temperature condition, and when the temperature of the reactor or the temperature of the semiconductor element part satisfies the predetermined temperature condition, the control unit performs changeover control of increase of a number of drive phases of the converting units.

2. The power source system according to claim 1, wherein the control unit increases the number of drive phases of the converting units when the output from the power source becomes a predetermined increase changeover output, or when the reactor is at a predetermined increase changeover temperature, or when the semiconductor element part is at a predetermined increase changeover temperature.

3. The power source system according to claim 1, wherein the control unit decreases the number of drive phases of the converting units when the output from the power source becomes a predetermined decrease changeover output, and when the reactor is at a predetermined decrease changeover temperature, and further when the semiconductor element part is at a predetermined decrease changeover temperature.

4. The power source system according to claim 1, wherein a changeover timing at a decrease time when the number of drive phases of the converting units is decreased is offset to a timing at which the output or the temperature is lower than that at a changeover timing when the number of drive phases of the converting units is increased.

5. The power source system according to claim 1, wherein the control unit performs changeover control of the number of drive phases of the converting units while maintaining a current flowing to the step-up converter at a predetermined current command value.

6. The power source system according to claim 5, wherein the control unit sets as a maximum deviation phase a phase of a converting unit that is changed over to drive or non-drive following changeover of the number of drive phases of the converting units, and increases or decreases the current value of the maximum deviation phase at a predetermined change rate at a changeover control time.

7. The power source system according to claim 1, wherein the control unit controls the output of the converting units at a predetermined change rate at a time point when the semiconductor element part or the reactor is at a limit start temperature that is set in advance.

8. The power source system according to claim 7, wherein a temperature sensor for detecting the temperature of the reactor is provided in a part of the plurality of converting units, and a limit start temperature of a converting unit in which the temperature sensor is provided is obtained from a heat resistant temperature of the reactor, and a limit start temperature of a converting unit in which the temperature sensor is not provided is the temperature obtained by subtracting a temperature variation due to a variation of a characteristic of the reactor from a heat resistant temperature of the reactor.

9. The power source system according to claim 1, wherein the power source is a fuel cell that generates power by an electrochemical reaction between a fuel gas and an oxidation gas.

* * * * *